March 25, 1969     E. J. POITRAS     3,434,351

FLUID MOTOR

Filed March 6, 1967     Sheet _1_ of 2

*Edward J. Poitras*
INVENTOR.

BY *John E. Toupal*
ATTORNEY.

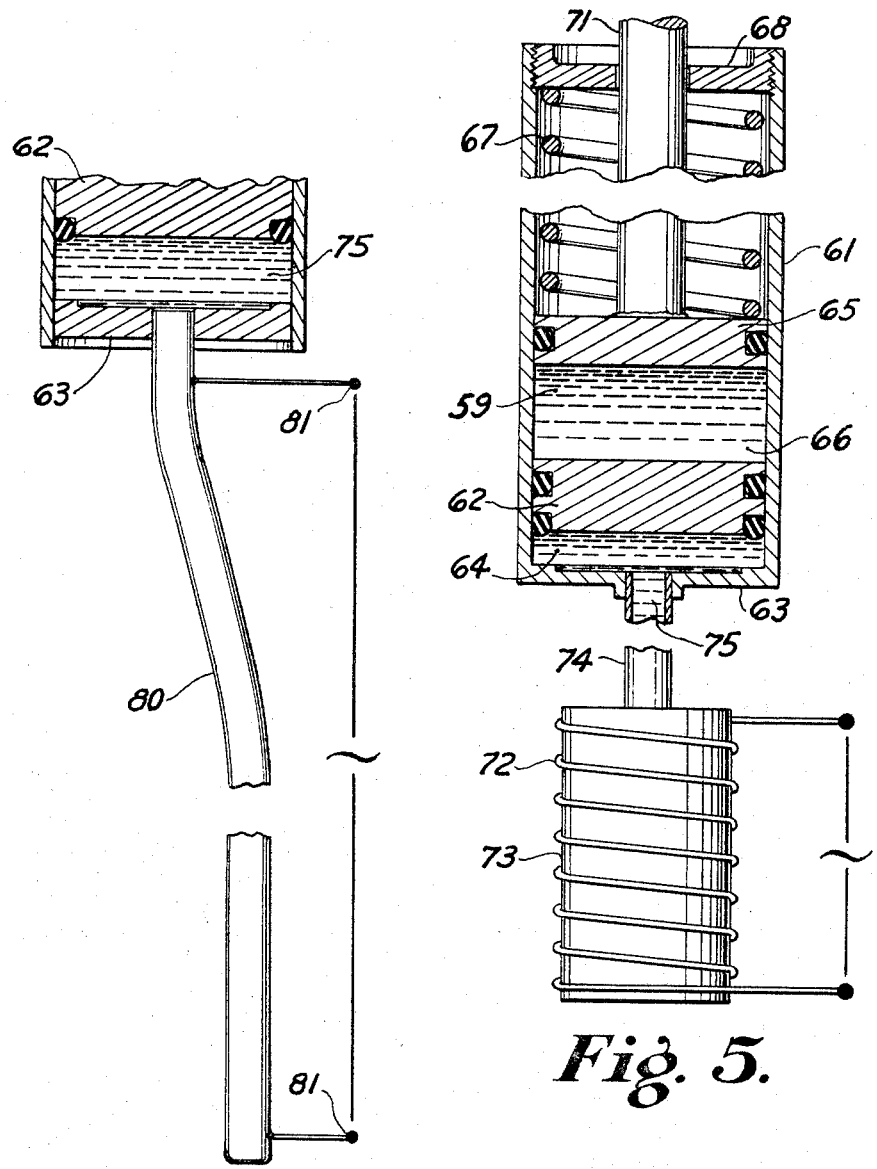

United States Patent Office 3,434,351
Patented Mar. 25, 1969

3,434,351
FLUID MOTOR
Edward J. Poitras, 198 Highland St.,
Holliston, Mass. 01746
Filed Mar. 6, 1967, Ser. No. 620,975
Int. Cl. G01k 5/44, 5/34; G05d 23/12
U.S. Cl. 73—368.3      9 Claims

ABSTRACT OF THE DISCLOSURE

A fluid motor apparatus having individual chambers separated by a movable piston and maintained at equal fluid pressures by a biasing spring member. The individual chambers isolate the motor's fluid control and fluid sealing functions allowing the use of uniquely suited distinct fluids for each function.

---

This invention relates generally to fluid motor apparatus and, more particularly, relates to a fluid motor especially suited for use as a temperature responsive measurement or control device.

Temperature responsive mechanisms for providing either measurement or control functions exist in a wide variety of forms. Such mechanisms include, for example, mechanical elements such as bi-metal strips, electrical elements such as thermocouples and units utilizing either fluid or solid materials which expand in response to increasing temperature. The expanding fluid devices include those utilizing Bourdon tubes or metallic bellows which expand in response to increased fluid pressure and those utilizing diaphragms which produce a flexing movement in response to changes in an associated fluid pressure.

Although the presently available temperature responsive indicators and controls provide useful functions in a wide variety of applications, they have all exhibited various individual and common traits which somewhat limit their overall effectiveness. For example, existing mechanical elements are severely limited in their application because of a high susceptibility to corrosion. Known electrical systems also are subject to corrosion and, in addition, are relatively delicate and sensitive so as to require substantial maintenance and frequent replacement of components. Similarly, metallic bellows and Bourdon tube devices suffer jointly or individually from such inherent characteristics as producing relatively low output forces, high cost, requirements for extensive ambient temperature compensation, measuring inaccuracies caused by the well known "breathing" effect in metallic bellows, etc. A primary disadvantage of the flexible diaphragm instruments is that the relationship between diaphragm movement and fluid expansion is not linear thereby requiring undesirable logarithmic calibration of control dials and indicating scales.

Functionally improved temperature responsive devices have been developed which utilize cylinder housed piston plungers movable in response to temperature induced volume changes of an actuating fluid. Such a device is disclosed, for example, in U.S. Patent No. 3,103,818. Although alleviating some of the inaccuracy and sensitivity problems noted above, piston plunger units exhibit another highly undesirable characteristic. Because of the required relative movement between cylinder and piston, an absolute fluid seal cannot be made. Accordingly, the possibility of operating fluid loss is present. A resultant reduction in operating fluid volume has the detrimental effect of altering the reference for piston movement as a function of operating fluid temperature which in turn introduces inaccurate measurement and control functions. Solutions to these problems formerly have entailed the use of mercury as an actuating fluid which, because of its extremely high surface tension, reduced fluid loss through the moving seals between the piston and cylinder. This solution is not fully satisfactory, however, because mercury's relatively low coefficient of thermal expansion inhibits its effectiveness as a thermally responsive operating fluid and the toxicity of its vapor creates operating risks.

The object of this invention, therefore, is to provide an improved, relatively low cost temperature responsive device which can offer reliability and a substantially maintenance free long life in a wide variety of measuring and control applications.

One feature of this invention is the provision of a fluid motor device having a cylindrical housing which defines a control chamber containing a condition responsive control fluid and an isolating chamber filled with an auxiliary fluid. Positioned within the housing are both a movable control piston which separates the control and isolating chambers and a movable auxiliary piston which partially defines the isolating chamber and is maintained in compressive contact with the auxiliary fluid by a resilient biasing mechanism. This combination maintains substantially equal fluid operating pressures in the control and isolating chambers thereby inhibiting leakage and loss of the control fluid through the moving seals between the cylindrical housing and the control piston. Thus, over long periods of time the device retains a constant volume of control fluid and a resultant constant relationship between changes in the condition sensed by the control fluid and movement of the control piston.

Another feature of this invention is the provision of a fluid motor device of the above featured type wherein the control chamber includes both a volume located between the control piston and an end wall of the cylindrical housing and a control fluid reservoir connected to the volume by a tube extending through the housing's end wall. The external reservoir permits the device to respond to changes of condition at a location remote from the device itself.

Another feature of this invention is the provision of an extremely compact and simple fluid motor device of the above featured types wherein the resilient biasing mechanism comprises a compression spring positioned within the cylindrical housing between an opposite end wall thereof and the auxiliary piston.

Another feature of this invention is the provision of a fluid motor device of the above featured type wherein the control fluid possesses, in a desired operating temperature range, both chemical stability and a relatively high coefficient of thermal expansion thereby rendering the device effective as a temperature responsive instrument.

Another feature of this invention is the provision of a fluid motor device of the above featured type wherein fluid loss is prevented by use of an auxiliary fluid possessing relatively high coefficients of viscosity and surface tension. Since the invention utilizes separate and distinct fluids for the required temperature response and sealing functions, one is able to select fluids uniquely suited for each of the functions thereby greatly improving its composite performance characteristics.

Another feature of this invention is the provision of a fluid motor device of the above featured type including an annular gasket adapted to create a fluid seal between the control piston and the outer periphery of the cylindrical housing's end wall. At lower than predetermined operating temperatures the control fluid contracts producing a vacuum in the fluid reservoir and a differential pressure across the control piston. Resultant motion of the control piston toward the housing's end wall causes seating thereon of the annular gasket. The stationary fluid seal formed by the annular gasket prevents, during these periods, possible leakage of the auxiliary fluid from the isolating chamber into the control chamber.

Another feature of this invention is the provision of a fluid motor device of the above featured types including an operating rod attached for movement with the control piston and extending through both the isolating chamber and a sliding fit aperture in the auxiliary piston. This arrangement is especially suited for use as a measuring instrument since small losses of auxiliary fluid from the isolating chamber will not affect the calibration between operating rod movement and control fluid temperature change.

Another feature of this invention is the provision of a fluid motor device of the above featured type wherein the operating rod is adapted to overcome an external force $F_o$, the biasing spring member exerts a constant force $F_s$ on the auxiliary piston, the control piston has an effective head area $A_c$ responsive to the fluid pressure in the control chamber, the auxiliary piston has an effective head area $A_a$ responsive to the fluid pressure in the isolating chamber and the ratio $F_s/F_o$ is substantially equal to the ratio $$\frac{A_a}{A_c-A_a}$$

This arrangement compensates for the head area and force differences of the control and auxiliary pistons and establishes precisely equal fluid pressures in the control and isolating chambers.

Another feature of this invention is the provision of a fluid motor device of the first featured types including an operating rod attached for movement with the auxiliary piston rather than the control piston. This extremely simple unit is suitable for control functions which require a substantial output force but do not require extremely precise calibration between operating rod movement and control fluid temperature change.

Another feature of this invention is the provision of a fluid motor device of the above featured type wherein the control fluid reservoir includes an elongated tubulation made of an electrically conductive material and adapted for connection to a source of electrical power. The rapid heat transfer produced by passage of electrical current through the elongated tubulation effects an abrupt change in operating fluid temperature and a very quick response movement by the operating rod.

These and other features and objects of the present invention will become more apparent upon a perusal of the following specification taken in conjunction with the accompanying drawings wherein:

FIG. 5 is a longitudinal view, partially in cross-section, of another embodiment of the present invention; and FIG. 6 is a longitudinal cross-sectional view of another embodiment of the invention.

Figure 1:
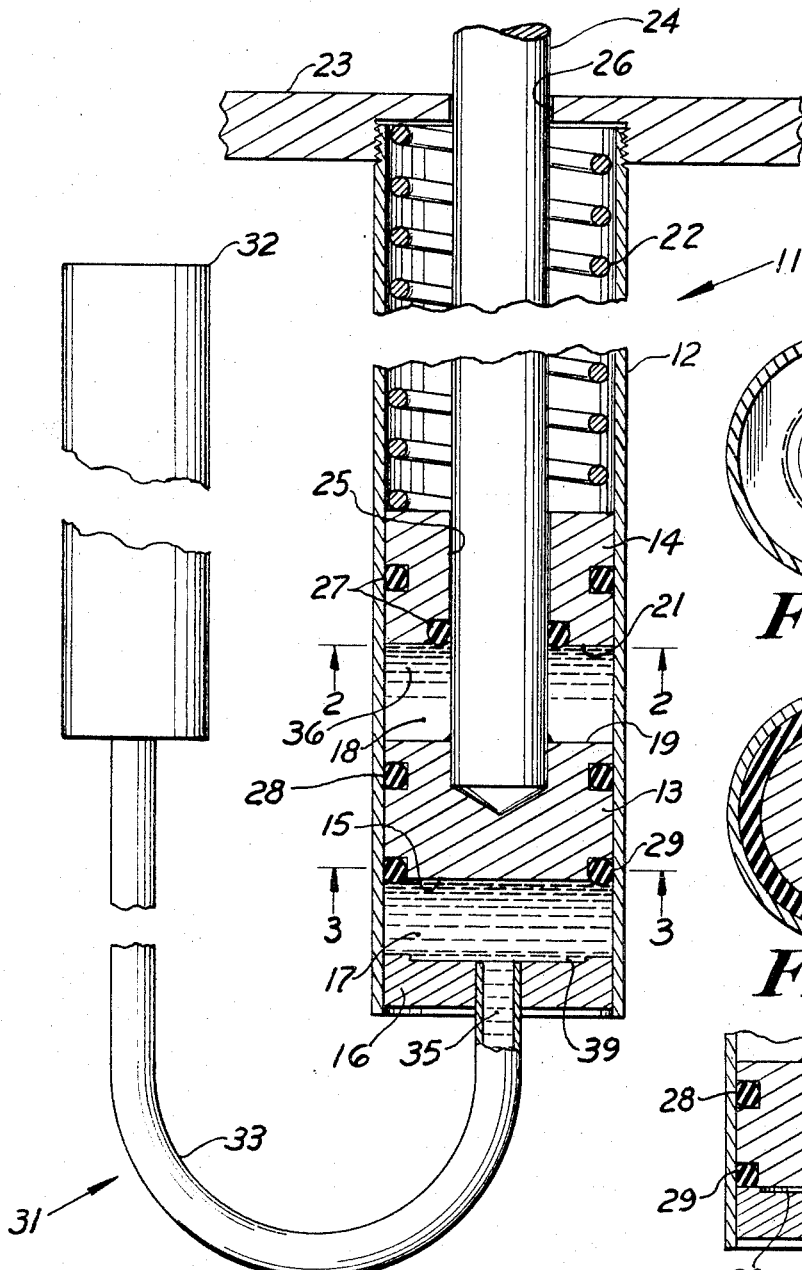
FIG. 1 is a longitudinal view, partially in cross-section, of a temperature responsive device according to the present invention.
Figure 2:
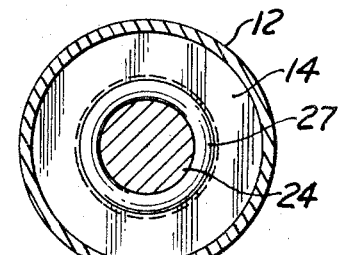
FIG. 2 is a transverse cross-sectional view of the device shown in FIG. 1 taken along lines 2—2.
Figure 3:
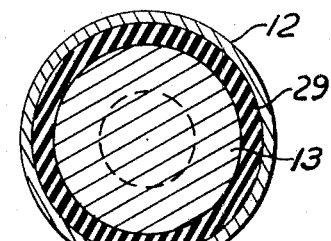
FIG. 3 is a transverse cross-sectional view of the device shown in FIG. 1 taken along lines 3—3.

Referring now to FIGS. 1–3 there is shown the housing 11 including the cylindrical casing 12 and the circular control and auxiliary pistons 13 and 14 mounted for axial movement therein. The lower head surface 15 of the control piston 13 and the casing's transverse end wall 16 partially form the control volume 17. Defining the isolating chamber 18 are the upper head surface 19 of control piston 13 and the lower head surface 21 of auxiliary piston 14.

The cylindrical biasing spring member 22 is mounted in compression between the auxiliary piston 14 and the flanged opposite end wall 23 of the cylindrical casing 12. Secured to for movement with the control piston 13 is the instrument operating rod 24 which extends through the isolating chamber 18 and through central apertures 25 and 26 in the auxiliary piston 14 and opposite end wall 23. The O-ring gaskets 27 provide sliding fluid seals between the auxiliary piston 14 and both the cylindrical casing 12 and the operating rod 25 while the O-ring gasket 28 provides a sliding fluid seal between the control piston 13 and the casing 12. Mounted in an annular recess in the control piston's lower surface 15 is the O-ring gasket 29 adapted for seating engagement with the outer peripheral edge of the end wall 16.

The housing 11 also includes the control fluid reservoir 31 formed by the fluid supply bulb 32 and attached fluid communication tube 33 which extends through a central aperture in the end wall 16. Together with the variable control volume 17 the spaces enclosed by the bulb 32 and tube 33 form a control chamber containing an operating fluid 35 which, in the intended operating temperature range, exhibits good chemical stability and a high coefficient of thermal expansion. The isolating chamber 18 is filled with an auxiliary fluid 36, preferably a liquid having relatively high surface tension and/or viscosity characteristics. Examples of suitable operating fluids include particular silicone fluids, certain oil mixtures, alcohol, etc. while examples of suitable auxiliary fluids include mercury with its high surface tension, high viscosity waxes, etc. It will be obvious, however, that in certain applications a common fluid could be desirably employed for both the control and auxiliary functions.

The embodiment shown in FIGS. 1–3 is particularly suited for instrument applications wherein the movement of operating rod 24 is used to measure the temperature sensed by the operating fluid in the bulb 32. Typically, such applications require relatively small output forces of, for example, less than five pounds. The movement of the operating rod 24 can be used to operate remote temperature indicators or controllers, small pilot valves, electrical switches, etc.

For normal operation of the device, the bulb 32 is positioned so as to sense a given ambient temperature which is to be monitored. Because of the flexible tube 33, the cylinder 12 can be mounted in a mechanically convenient remote location. Upon an increase in the ambient temperature, the operating fluid 35 expands in the bulb 32 and tube 33 and flows into the cylinder 12 forcing the control piston 13 and attached operating rod 24 upwardly. Similar upward movement is experienced by the fluid 36 and auxiliary piston 14 which further compresses spring member 22. The movement of the operating rod 24 is utilized in a conventional manner to provide a desired indicating or control function.

By selecting a spring member 22 which exerts against the auxiliary piston 14 a constant force substantially greater than the external force exerted on the instrument operating rod 24 and utilizing a rod having a diameter small compared to the internal diameter of the casing 12, the fluid pressures within the isolating chamber 18 and the control volume 17 can be made substantially equal. This is because the effective head areas of the control piston lower surface 15 and auxiliary piston lower surface 21 will be substantially equal as will the forces acting upon them. Furthermore, the fluid pressure balance is aided by the fact that the slightly increased force exerted on the control piston 13 as a result of its attachment with the operating rod 24 tends to compensate for the slightly reduced area of the auxiliary piston 14 resulting from its central aperture 25.

Equalization of fluid pressure on both sides of the control piston 13 eliminates any tendency for fluid to leak through the moving seals between the piston and the casing 12. Thus, over long periods of time, the volume of operating fluid 35 in the control chamber remains constant and the temperature measuring accuracy of the device is unimpaired. Also, because of its high surface tension and/or viscosity, leakage of the auxiliary liquid 36 through the moving seals between the auxiliary piston 14 and either the operating rod 24 or the casing 12 is minimized. It should be noted, however, that gradual loss of auxiliary fluid 36 from the isolating chamber 18 does not affect the accuracy of the device. These losses merely allow elongation of the spring member 22 resulting in downward movement of auxiliary piston 14 on the operating rod 24 and contraction of the isolating chamber 18 so as to maintain a constant fluid pressure therein. Such an occurrence has no effect upon the degree of movement experienced by the control piston 13 in response to ambient temperature changes of the control liquid 35.

Thus, the temperature responsive unit illustrated in FIGS. 1–3 provides the mechanical simplicity, linearity, reliability, and flexibility of a piston plunger type device and also eliminates, over relatively long periods of time, the possibility of measuring inaccuracies which result from losses of operating fluid. These combined advantages are derived by utilizing separate fluid bodies for distinct instrument functions; i.e. the control and sealing functions, thereby permitting selection of individual fluids having unique characteristics particularly suited for each function. For example, the sealing capability of mercury, with its extremely high coefficient of surface tension can be obtained by its use as the auxiliary fluid 36, while a different fluid with a much greater coefficient of thermal expansion is utilized desirably for the control fluid 35. Also, since the housing 12 is usually remote from the high temperature operating environment of the bulb 32, the auxiliary fluid 36 need not possess the high temperature chemical stability required of the control fluid 35.

In a preferred embodiment of the invention illustrated in FIG. 1, the above noted compensating effects of increased force on the control piston 13 and reduced effective head area of the auxiliary piston 14 are made equal thereby assuring exactly the same pressures in the isolating chamber 18 and the control chamber 31. This is done by selecting, for a unit adapted to overcome with the operating rod an external force $F_o$, a spring member 22 which exerts on the control piston 14 a constant force $F_s$ such that the ratio $F_s/F_o$ is substantially equal to the ratio $$\frac{A_a}{A_c - A_a}$$

where $A_a$ represents the effective head area of the auxiliary piston 14 which is responsive to the fluid pressure in the isolating chamber 18 and $A_c$ represents the effective head area of the control piston 13 which is responsive to the fluid pressure in the control volume 17.

Figure 4:
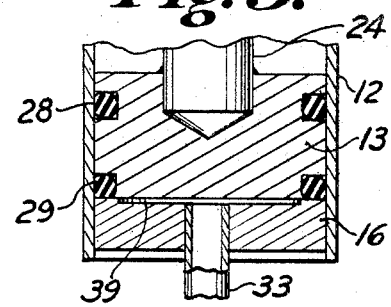
FIG. 4 is a partial longitudinal cross-sectional view of the device shown in FIG. 1 with the control piston in a closed inoperative position.

By appropriate selection of an operating fluid, the embodiment of FIG. 1 can be made effective for any of a wide variety of temperature response ranges. However, during inoperative periods such as when being stored or transported, a device designed for use at minimum temperatures above 100° F. can be subjected to substantially lower temperatures. At these times, there can occur sufficient contraction of the operating fluid 35 to produce a vacuum pressure within the tube 33. With a vacuum pressure in the tube 33, the above mentioned fluid pressure equalization on both sides of the control piston 13 is replaced by a differential pressure which tends to force auxiliary fluid 36 between the piston 13 and the casing 12 into the tube 33. This undesirable consequence is prevented by absolute fluid seal created when the O-ring gasket 29 is forcibly seated (as shown in FIG. 4) against the end wall 16 by that very differential pressure. Creation of a fluid seal between the flat surfaces of the control piston 13 and end wall 16 is prevented by the radial slots 39 therein. For this reason, an effective control piston head area of substantial size is assured with the piston in the closed position shown in FIG. 4.

FIG. 5 is another invention embodiment primarily intended for use in power applications requiring substantial output forces of, for example, 5 to 500 lbs. Such applications include the control of large valves, mechanical dampers, etc. The illustrated device is similar to that shown in FIG. 1 with the cylindrical casing 61 enclosing a floating control piston 62. The control piston 62 forms with the end wall 63 a control volume 64 and with the auxiliary piston 65 an isolating chamber 66 filled with the auxiliary fluid 59. Supported in compression between the auxiliary piston 65 and the opposite end wall 68 is the spring member 67. However, in this embodiment, the operating rod 71 is attached for movement with the auxiliary piston 65 rather than with the control piston 62. Also, a heating coil 72 surrounds the operating fluid supply vessel 73 which is filled with operating fluid 75 and is connected for fluid communication with the control volume 64 by the connecting tube 74.

During operation of this embodiment a control movement of the operating rod 71 is obtained by initiating a flow of electrical current through the heater coil 72. The resistive heating produced in the coil 72 warms the operating fluid 75 which expands into the control volume 64. This produces simultaneous upward movement of the control piston 62, the body of auxiliary fluid 59, and the attached auxiliary piston 65 and operating rod 71. As in the above embodiments the fluid pressures in the isolating chamber 66 and control volume 64 are equal thereby preventing leakage of control fluid 75 through the moving seals between the control piston 62 and the cylindrical casing 61 and loss of auxiliary fluid 59 is inhibited by utilization of a liquid having an extremely high viscosity. Thus, the unit can be used over extended periods of time without the requirement for operating fluid replenishment. It will be apparent that in this embodiment eventual loss of auxiliary fluid 59 will alter the relationship between operating rod movement and operating fluid temperature change. Accordingly, this unit is intended for use in applications wherein extremely accurate calibration is not required.

FIG. 6 shows another invention embodiment identical to that shown in FIG. 5 except that the supply vessel 73 and surrounding heater coil 72 are replaced by the elongated tube 80 having at opposite ends the electrical terminals 81. Upon connection of the terminals 81 to a suitable source of power (not shown), an electrical current is circulated through the tube 80 which is made of an electrically conductive material. The resultant resistive heating warms the tubes' operating fluid content and produces movement of an operating rod in the same manner described for the embodiment of FIG. 5. Because of the direct resistive heating of the tube 80 and its high surface area to volume ratio an extremely rapid operating fluid temperature rise and fall can be obtained.

Obviously, many modifications and variations of the present invention are possible in light of the above teachings. For example, the individual features illustrated in the various invention embodiments can be used in combinations other than those shown. Also, it should be understood that the term fluid as used in both the description and claims has reference to vapors and gases as well a to liquids. In fact, the invention can have particular utility with gaseous or vaporous operating fluids since the problem of operating fluid loss through moving seals is accentuated with these fluids. It is, therefore, to be understood that within the scope of the appended claims the invention can be practiced otherwise than as specifically described.

What is claimed is:

1. A fluid motor apparatus comprising a hollow cylinder, a movable control piston disposed within said hollow cylinder, a movable auxiliary piston disposed within said hollow cylinder, an isolating auxiliary chamber defined within said hollow cylinder between said control piston and said auxiliary piston, a control chamber defined between said control piston and a transverse end wall of said hollow cylinder, a condition responsive control fluid contained in said control chamber and adapted to produce movement of said control piston in response to changes in a sensed variable condition, an auxiliary fluid filling said isolating chamber, a resilient biasing means exerting on said auxiliary piston a force tending to compress said auxiliary fluid, seal means providing fluid seals between the outer peripheries of said pistons and said hollow cylinder, and an additional seal means comprising an annular gasket disposed between said control piston and the outer periphery of said transverse end wall and adapted to provide a fluid seal therebetween.

2. A fluid motor apparatus according to claim 1 wherein said control chamber further comprises a control fluid reservoir having a tube portion extending through said end wall.

3. A fluid motor apparatus according to claim 2 wherein said resilient biasing means comprises a compression spring member positioned between said auxiliary piston and an opposite end wall of said cylinder means.

4. A fluid motor apparatus according to claim 3 including an operator means attached for movement with said control piston and extending through said isolating chamber and through said auxiliary piston via an aperture which provides a fluid tight slideable fit between said auxiliary piston and said operator means.

5. A fluid motor apparatus according to claim 4 wherein said operator is adapted to provide an operative output force $F_o$, said spring member exerts on said auxiliary piston a constant force $F_s$, said control piston has an effective head area $A_c$ responsive to the fluid pressure in said control chamber, said auxiliary piston has an effective head area $A_a$ resonsive to the fluid pressure in said isolating chamber, and the ratio $F_s/F_o$ is substantially equal to the ratio $$\frac{A_a}{A_c - A_a}$$

6. A fluid motor apparatus according to claim 4 wherein said operator means extends through said opposite end wall of said cylinder means.

7. A fluid motor apparatus according to claim 6 wherein said control fluid comprises a control liquid which possesses in a desired operating range a relatively high coefficient of thermal expansion.

8. A fluid motor apparatus according to claim 7 wherein said auxiliary fluid comprises an auxiliary liquid having greater viscosity than said control fluid.

9. A fluid motor apparatus according to claim 7 wherein said auxiliary liquid possesses a substantially higher surface tension than said control fluid.

References Cited

UNITED STATES PATENTS

| | | | |
|---|---|---|---|
| 1,733,250 | 10/1929 | Davis | 219—300 |
| 2,324,647 | 7/1943 | Ray | 60—25 |

FOREIGN PATENTS

| | | |
|---|---|---|
| 1,231,830 | 4/1960 | France. |

OTHER REFERENCES

Schlippe: German allowed application No. 1,016,502, Sept. 26, 1957

CARROLL B. DORITY, JR., *Primary Examiner.*

U.S. Cl. X.R.

60—23; 92—130, 135